May 7, 1968     E. H. BORN     3,381,624

FAIL SAFE CONTROL FOR HYDRAULIC CROSS-CENTER PUMP

Filed Sept. 9, 1966     2 Sheets-Sheet 2

INVENTOR
Ellis H. Born
BY Wood, Herron & Evans
ATTORNEYS

United States Patent Office 3,381,624
Patented May 7, 1968

3,381,624
FAIL-SAFE CONTROL FOR HYDRAULIC CROSS-CENTER PUMP
Ellis H. Born, Columbus, Ohio, assignor to Abex Corporation, New York, N.Y., a corporation of Delaware
Filed Sept. 9, 1966, Ser. No. 578,331
11 Claims. (Cl. 103—162)

This invention relates to a fail-safe system for controlling the displacement or volumetric output of a cross-center type hydraulic pump which is operated in conjunction with an electrical circuit. More specifically, this system provides automatic reduction of pump output to substantially zero upon malfunction of designated type in the electrical circuitry associated with the pump, together with manual servocontrol capability after the electrical system malfunction and optional manual override of the pump electrical control circuit at any time.

By the term "cross-center pump" is meant that type of variable displacement hydraulic pump which includes movable displacement changing means positionable to establish a desired output flow rate within an operating range which extends from a maximum of fluid flow in one direction through the pump, through zero flow, to a maximum of flow in the opposite direction through the pump. The displacement changing means typically comprises a hanger which is mounted for pivoting movement, as on trunnions, the angular position of the hanger controlling pump displacement. The position of the hanger can be changed by fluid operated piston means or stroking pistons which act oppositely on the hanger to swing it about the trunnions or axis of pivot.

The cross-center pumps in commercial use today are often very large units, capable of flow rates up to 200 gallons per minute or more. With such pumps displacement must frequently be varied to match the flow requirement of the system served by the pump. However, very large forces are required to change and even to maintain a selected hanger position. In many installations such displacement control is effected by a multistage electrically controlled servovalve which regulates the application or release of pressure from a source to the stroking pistons to change the displacement of the pump to a desired new setting. For example, electrically controlled servovalves are used to control cross-center pumps for driving hydraulic motors for operating winches; by applying an electric signal of predetermined magnitude to the servovalve, the displacement control is adjusted to cause the pump to deliver a desired volumetric output for driving the hydraulic motor and the winch at a desired rate.

In applications such as that just referred to and others wherein the pump is responsive to an electrical input, and more broadly wherein the pump is operated in conjunction with any electrically controlled or operated mechanism, it is frequently desirable that provision be made for rapidly and automatically moving the pump displacement changing means to essentially zero displacement position if there is an electrical failure or malfunction of designated type in the electrical circuitry in connection with which the pump is operated. Thus, where the pump drives a hydraulic winch motor or large press ram, it is important that the pump be responsive for example to a failure in the servovalve control circuit, so that the pump will be shifted to zero delivery and thereby promptly arrest movement.

Beyond responding to an electrical system failure, it is further desirable that provision be made for manual control of pump displacement after an elecrtical system failure, and for local "at pump" manual control even when the electrical circuit is operating properly, for setting a different displacement than that which the electrical system has established. It is further desirable that upon termination of the manual control, the system should automatically return at once to the electrical control signal, and resume normal operation.

In preferred form the fail-safe control circuit of this invention includes a cross-center pump having displacement changing means which is operated in opposite directions by two stroking pistons to which operating pressure fluid can be applied from a pilot source. The flow of fluid to these pistons is directed by a solenoid controlled reversing valve through either of two parallel branch circuits, one of which includes an electrically controlled hanger positioner servovalve and the other of which includes a manually controlled hanger positioner servovalve, both of which receive feedback signals from the pump reflecting instantaneous hanger position. Pressure fluid from the source is directed by the reversing or fail-safe valve through one or the other of the two hanger positioner servovalves depending upon whether its solenoid is energized, and oppositely arranged check valves block the flow of fluid to the other servovalve. When the solenoid is energized, the reversing valve directs flow through the electrically controlled servovalve. The solenoid is deenergized by means responsive to a failure of predetermined type in the electrical system associated with the pump, and when deenergized supplies fluid to operate the stroking pistons only via the manually controlled servovalve. The latter is connected to deenergize the solenoid at any time the manually controlled servovalve is moved from its normal closed no signal position, thereby overriding the electrically controlled servovalve at any time even though the latter may be operating, as well as providing a manual control capability upon failure of the electrical system.

The invention can best be further described by referring to the accompanying drawings in which.

Figure 1:
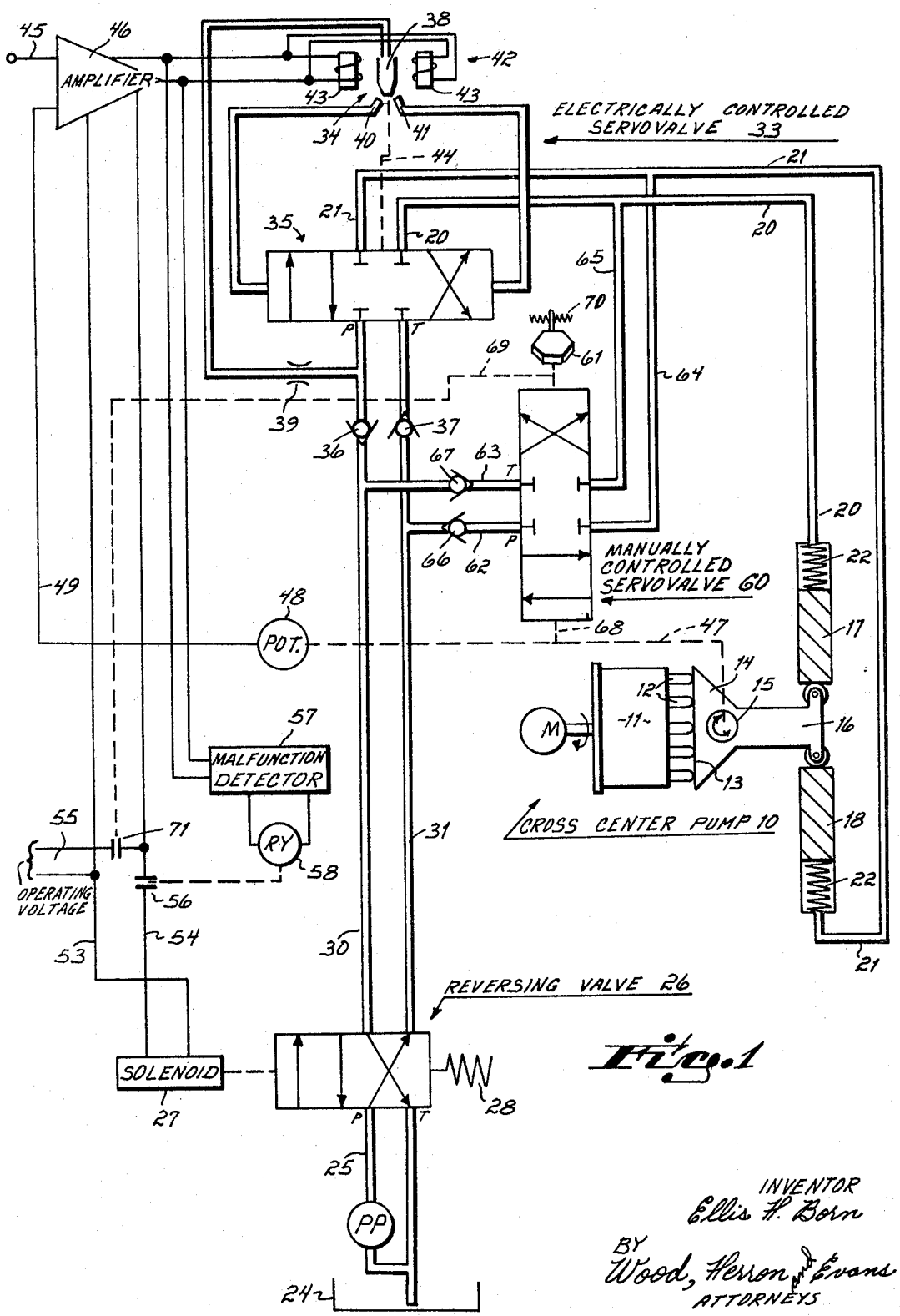
FIGURE 1 is a diagrammatic illustration of a hydraulic and electrically operated fail-safe system for changing the displacement of a cross-center pump, in accordance with a preferred embodiment of the invention.

The cross-center pump shown diagrammatically at 10 in FIGURE 1 may be of known type, and for purposes of this description is illustrated as an axial piston pump having a rotatable cylinder barrel 11 containing a plurality of reciprocable pistons 12. The pistons 12 have shoes bearing against a cam surface 13 provided on a hanger 14 which is mounted for rotation on trunnions, one of which is shown at 15, about an axis transverse to the axis of barrel 11. The pump 10 is driven by a prime mover designated by M. The hanger 14, i.e., the pump displacement changing means, includes an arm or extension 16 engaged on opposite sides by hydraulic piston means in the form of stroking pistons or lineal fluid motors 17 and 18. Pistons 17 and 18 may be equal cross-sectional area and are served respectively by hydraulic fluid lines 20 and 21.

It will be apparent that when pressure fluid is applied to line 20 and line 21 is connected to a fluid drain or tank, hanger arm 16 will be swung in the clockwise direction around trunnions 15, and vice versa. In FIGURE 1 hanger 14 is shown in the zero displacement position, in which rotation of barrel 11 by prime mover M causes no substantial reciprocating movement of the pistons 12, so that the piston displacement and the volumetric flow rate through the pump 10 are essentially zero. Springs 22, 22 may be provided to assist in urging pistons 17 and 18 toward the centered position shown, however these springs will not center the hanger when pressure fluid is trapped behind either of the pistons. Rotation of the hanger 14 in one direction about trunnions 15 from center position causes flow through the pump to be increased, up to a maximum established by pump geometry, while rotation of the hanger in the opposite direction from center causes flow to be increased from zero to a maximum of flow in the other direction through the pump.

Pressure fluid for moving the stroking pistons 17 and 18 is supplied from a secondary pump or pilot pump PP which receives fluid from a tank 24. The pilot pump discharge or pressure line 25 is connected to the pressure port of a solenoid controlled spring return reversing valve shown diagrammatically at 26, which constitutes the failsafe valve of the system, as will be described.

The reversing valve 26 includes a spool which can be shifted between two operating positions by a solenoid 27 which operates against the return spring 28. In FIGURE 1 the fluid paths through reversing valve 26 to the hydraulic lines 30 and 31 served by the valve, are shown as they are when solenoid 27 is deenergized. In this deenergized condition—corresponding to electrical system failure—the valve pressure port P is connected to line 31, and line 30 is connected to tank port T; when solenoid 27 is energized, valve 26 provides a flow path from line 25 to line 30, and from line 31 to tank port T.

Fluid communication between lines 30 and 31 and stroking pistons 17 and 18 is provided through parallel or branch flow paths, one of which includes an electrically controlled two-stage servovalve designated generally by 33, and the other of which includes a manually controlled servovalve 60. As will be seen hereinafter, check valve means are provided in the branch flow paths so that the servovalves 33 and 60 are supplied with pressure fluid alternately, and hence alternately control the stroking pistons; when solenoid 27 is energized, pressure fluid is applied from source PP only to the electrically controlled servovalve 33, and when solenoid 27 is not energized, pressure fluid is applied only to the manually controlled servovalve 60.

The internal construction per se of the electrically operated servovalve 33 forms no part of the invention, and servovalve 33 may for example be of the type shown in Patent No. 2,884,907 to Raymond D. Atchley.

In broad terms, servovalve 33 comprises a pilot stage designated at 34 and a main stage designated at 35, the latter including a lineally shiftable spool moved in accordance with fluid pressures acting upon opposed control or end surfaces thereof and providing conventional four-way type porting with a closed center position. In FIGURE 1 the main stage 35 is shown in the closed or centered position, in which all fluid communication between lines 20, 21, 30 and 31 is blocked. When an unbalanced pressure is applied to one control surface of the main stage pool of servovalve 33 the spool is shifted to provide fluid communication from line 30 to line 21, and from line 20 to line 31; when unbalanced pressure is applied to shift the spool of the main stage 35 in the opposite direction from centered position, communication is established from line 30 to line 20 and from line 21 to line 31. Check valves 36 and 37 are included in lines 30 and 31 respectively, check valve 36 being oriented to permit flow in line 30 from one work port of reversing valve 26 only toward servovalve 33, check valve 37 being oriented to permit flow in line 37 only in the direction toward the other work port of reversing valve 26.

The pilot stage 34 of the electrically controlled servovalve 33 may suitably be of the jet displacement type shown diagrammatically in FIGURE 1, having a resilient jet tube 38 to which pressure fluid is supplied from line 30, through a restrictor 39, and from the outer or movable end of which a fluid jet stream issues. This jet stream is displaceable toward one or the other of a pair of receptor ports 40 and 41 by a torque motor 42 including electromagnets designated at 43, 43, which acts to deflect jet tube 38. Providing solenoid 27 is energized so that pressure fluid is applied to tube 38, then when torque motor 42 is energized so that jet tube 38 is deflected toward receptor port 40 from its normal centered position, the jet stream will be divided unequally and will establish a pressure differential between ports 40 and 41, the greater pressure being applied from port 40 to the left control surface of the main spool of primary stage 35, causing the spool to shift and thereby to connect lines 30 and 21, and so on. Conversely, when torque motor 42 is energized by an input signal of opposite polarity jet tube 38 will be defected toward receptor port 41; pressure will then be applied to the opposite control surrface of the main stage spool, shifting it in the other direction from center and reversing the connections between the lines served by the valve.

The torque motor 42 of servovalve 33 is responsive to an electrical signal input from line 45 which is amplified at 46, in known fashion. In the "no signal" condition, jet tube 38 is normally centered between receptor ports 40 and 41, and the jet stream establishes no pressure differential tending to move the spool of the main stage 35 from its centered or flow blocking position. Accordingly, when no signal is applied to amplifier 46 pressure fluid is neither admitted to nor released from the cylinder of either stroking piston 17 or 18 through the electrically controlled servovalve 33, regardless of the energization or deenergization of reversing valve 26. Application of an electrical control signal to line 45 causes a current of predetermined magnitude and polarity to be applied to torque motor 42, thereby displacing the jet stream toward one of the receptor ports, depending on the polarity of the signal, and creating a differential on the ends of the main stage spool and shifting the spool from centered position. Fluid can thereupon flow from reversing valve 26 into one stroking cylinder and is released from the other stroking piston cylinder, to tank, changing pump displacement. Movement of the main spool of servovalve 33 is stopped when the spool has moved sufficiently that a feedback spring 44 coupling the spool to the jet tube 38, balances out the torque motor force and restores the jet to centered position. As the hanger continues to turn about trunnions 16, an increasing angular hanger position feedback signal is applied through a mechanical interconnection indicated diagrammatically at 47 to a potentiometer 48 in which the signal is transduced to an electrical signal. This electrical feedback signal is applied to amplifier 46 via an electrical connection 49, and is of polarity opposite to that of the input signal in line 45 and it is employed to balance out the input signal. As the feedback signal increases in magnitude the net signal is thereby decreased, and the torque motor force is reduced. As the torque motor force is reduced, feedback spring 44 displaces the jet in the opposite direction from center, causing the main stage spool to be moved toward closed position and, when the hanger has moved to a position at which the potentiometer signal exactly cancels the input signal, the main stage spool has returned to a stable centered position and the hanger movement is terminated at the desired position.

The manually controlled rotary servovalve designated by 60 is connected in parallel with the electrically controlled servovalve 33, to provide an alternate hanger control capability which in effect by-passes the electric servovalve 33. This rotary servovalve 60 is operated by a control means or handle 61 to adjust flow between the ports served by the valve according to the direction and degree of the input rotary signal. The pressure (P) and tank (T) ports of valve 60 are connected by lines 62 and 63 respectively to lines 31 and 30 respectively, between the reversing valve 26 and the check valves 37 and 36. Line 62 includes a check valve 66 which permits flow toward servovalve 60, and line 63 includes a check valve 67 which permits flow only in the direction toward line 30.

When control means 61 is rotated in one direction from centered position, the valve 60 establishes a flow path from line 62 to line 64 and to piston 18, and a second flow path from piston 17 and line 65 to line 63; when handle 61 is rotated in the other direction from its centered position, valve 60 establishes flow paths from line 62 to line 65 and from line 64 to line 63. The opening of flow paths through rotary servovalve 60 causes hanger 14 to be turned. Rotation of the hanger about trunnions 15 is fed back as a rotary mechanical motion through a linkage 68 to rotary valve 60, and when the hanger rotation just equals the rotary input signal applied to control means 61, the servovalve closes thereby causing the hanger to remain in that position until the control means 61 is moved again. A spring return 70 urges control means 61 to a center closed position, and release of the means 61 when it has been displaced manually will automatically restore the handle to center position, thereby also restoring the hanger to its center position. One suitable embodiment of the rotary servovalve 60 is described hereinafter.

The reversing valve solenoid 27 is energized through electrical leads 53 and 54 by a source of operating voltage at 55. This source of voltage 55 may, as shown in FIGURE 1, be the same source of voltage which powers amplifier 46, or it may be a voltage taken from another circuit associated with the pump to failure of which the reversing valve is to be responsive, for example, high line tensioning equipment associated with winching mechanism driven by the pump 10. Failure of this voltage for any reason will deenergize the solenoid 27, thereby causing the reversing valve to be moved to its "failure" position by spring 28. If the failure occurs at a time when servovalve 33 has been controlling the hanger at an off-center position, the deenergization of solenoid 27 will connect the alternate or by-pass servovalve 60 into the hanger supply lines 20 and 21, and a flow path will be opened through servovalve 60 by which the hanger is quickly moved to center, as described more fully hereinafter.

Solenoid 27 can also be made responsive to system failure at any of a number of different points, by including in the solenoid energizing circuit one or more relay contacts as indicated at 56 which are caused to open upon failure of any particular electrical component. By way of illustration, it is desirable to deenergize the solenoid in response to failure, as by shorting, of amplifier 46. Such failure is manifested and detected automatically as a signal to the torque motor 42 which is of too high magnitude, or which is of too long duration. These symptoms are sensed by a malfunction detector 57 which causes a relay 58 to open the contacts 56 in the event of failure of the proscribed type. Alternatively, failure of the feedback potentiometer 48, as for example by shorting of its wiper or center tap, can be taken as the signal to open contacts in the solenoid circuit thereby deenergizing the solenoid and switching the system to fail-safe condition.

When reversing valve 26 is switched to the failure condition, pressure from line 25 is applied to line 31, and line 30 is connected to tank. By reason of the orientation of check valves 36 and 37, pressure fluid in line 31 is blocked from flowing through the electrically controlled servovalve 33; hence, regardless of the position of the servovalve main spool no fluid can flow to the displacement piston means through that servovalve. Pressure from line 31 is applied through check valve 66 to manually controlled servovalve 60. If servovalve 60 is in its normal closed or centered position, flow through that valve is blocked, but whenever handle 61 is turned, pressure will be applied through servovalve 60 to one or the other of the stroking pistons, thereby causing hanger rotation in an amount corresponding to the input manual turning signal, as previously described. Thus, it will be seen that manual control is available automatically upon any preselected type of failure of the electrical system. This manual control provides an alternate take-over capability upon electric circuit failure.

In addition, however, the system also provides an overriding manual control capability even where the electrically controlled servovalve 33 is functioning properly and is being used to control the position of the hanger. To this end, the manually controlled servovalve 60 is mechanically connected by a linkage designated diagrammatically at 69 to normally closed switch contacts 71 in the solenoid energizing circuit, so that when the control handle 61 is turned from its centered position, the contacts 71 are automatically opened, thereby deenergizing solenoid 27 and blocking flow through the electrically controlled servovalve 33, and simultaneously directing flow to the manually controlled servovalve 60 for controlling the hanger position.

By reason of the opposite arrangements of check valves 36 and 67 with respect to line 30, and the opposite arrangements of check valves 37 and 66 with respect to line 31, it will be seen that when pressure is applied to the manually controlled servovalve, flow through electrically controlled servovalve 33 is automatically blocked, and vice versa, so that fluid can flow only alternately in the by-pass or branch parallel lines.

Figure 2:
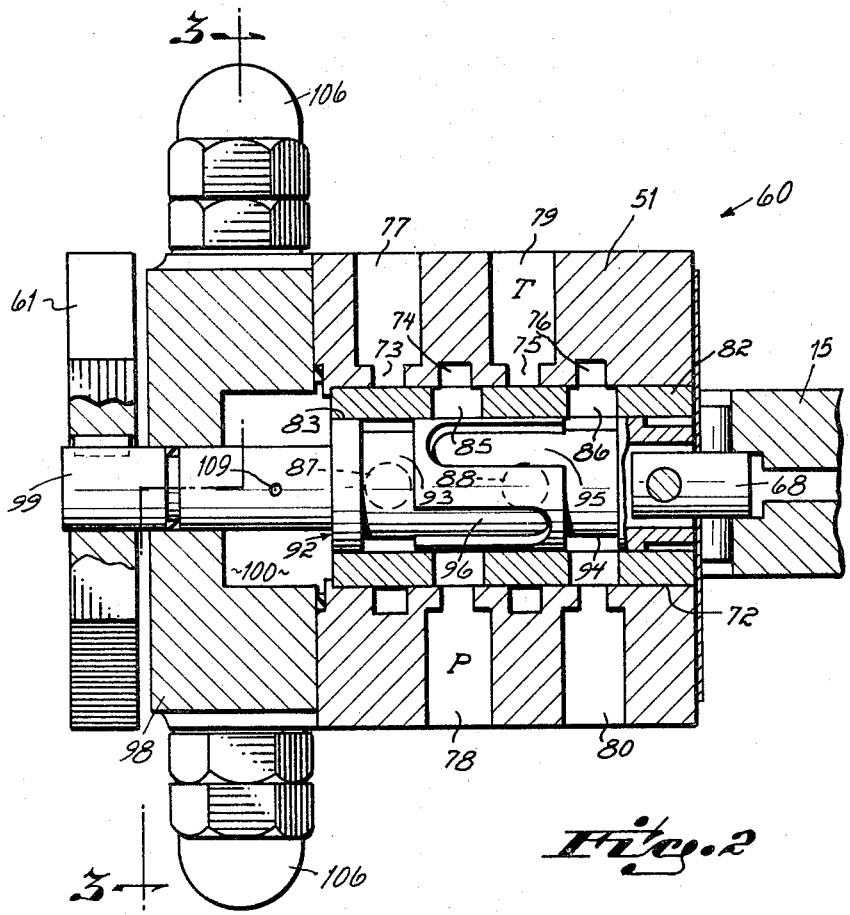
FIGURE 2 is an axial section through a preferred form of manually controlled rotary servovalve suitable for use in the system shown in FIGURE 1.
Figure 3:
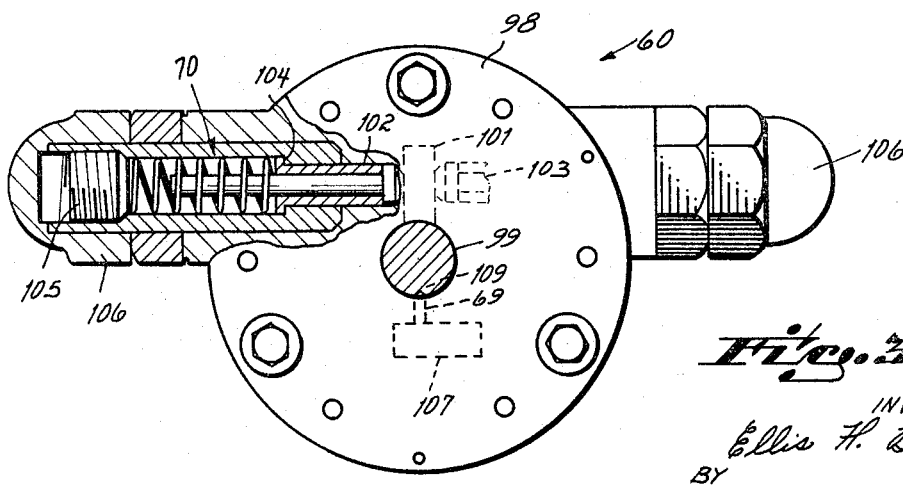
FIGURE 3 is a cross-section taken on line 3—3 of FIGURE 2.

FIGURES 2 and 3 of the drawings illustrate a preferred form of the manually controlled rotary servovalve 60. In this structure the valve 60 includes a valve body or housing 51 which may be integral with or mounted to the pump body, not shown. Body 51 has an axial bore 72 in which are formed four equally spaced internal circumferential grooves 73, 74, 75, and 76. These grooves 73–76 provide communication between bore 72 and ports 77, 78, 79 and 80 respectively.

Body bore 72 contains a sleeve 82 which is movable therein in rotation but not in translation. Sleeve 82 has a cylindrical internal chamber 83, and a pair of spaced parallel cross bores 85 and 86 afforded communication between the internal chamber 83 and body grooves 74 and 76, while a second pair of spaced parallel cross bores 87 and 88 oriented at right angles in the sleeve with respect to bores 85 and 86, afford communication between internal chamber 83 and body grooves 73 and 75. At one end this sleeve 82 is connected to one of the pump hanger trunnions 15 through the universal connection 68. When the pump displacement changing means is actuated to turn the hanger, trunnion 15 rotates and rotates the sleeve 82 through equal angular movement. It will be seen that the sleeve ports 85, 86, 87 and 88 communicate with their respective body grooves at all times, regardless of the angular position of sleeve 82 with respect to body 51.

A spool 92 is rotatably carried in sleeve internal chamber 83, and includes a pair of circumferential grooves 93 and 94 which are axially aligned with and which constantly communicate with sleeve ports 87 and 86 respectively. Spool 92 is also configured with two similar, diametrically opposite milled longitudinal slots, one of which is seen at 95 in FIGURE 2, which extend from spool groove 94 a distance sufficient to communicate with sleeve ports 85 when angularly aligned therewith.

Spool 92 has a second pair of diametrically opposite longitudinal milled slots, one of which is seen at 96 in FIGURE 2, extending from spool groove 93 a distance sufficient to communicate with sleeve ports 88 when the slots 96 are angularly aligned therewith. These two pairs of slots 95 and 96 are oriented at 90° angles with respect to one another and are so dimensioned that, when the valve is in the closed or centered position shown in FIGURE 2, fluid communication is just cut off with each of the sleeve ports 85 and 88.

A cap 98 is mounted to valve body 51 at one end thereof, and this cap contains the centering means designated generally at 70 by which the valve 60 is automatically returned to centered closed condition upon release of an actuating force. Spool 92 includes a stem 99 of reduced diameter which projects through an internal cavity 100 in cap 98 and through an opening at one end of the cap. The control means 61, which may be a hexagonal nut as shown, is keyed to the outer end of spool stem 99 for imparting rotational movement to the stem relative to the valve body and sleeve. Suitable sealing means such as the O-rings shown are provided around stem 99 and between the cap 98 and body 51.

Centering mechanism 70 includes a roll pin 101 (shown by dotted lines in FIGURE 3) projecting at right angles from spool stem 99. Pin 101 is engaged on opposite sides by spring loaded plungers 102 and 103. These plungers 102 and 103 have stops, one of which is designated at 104 in FIGURE 3, whereby each plunger is limited from moving beyond that position at which spool 92 is in centered or closed position. The compression of the centering springs may be adjusted by screw means designated at 105 which are covered by acorn nuts or caps 106. It will be appreciated that spool 92 is not connected to the universal 68, and that it can rotate relative to both sleeve 82 and body 51.

For automatically deenergizing the reversing valve solenoid 27 when the control knob 61 of the rotary servovalve 60 is turned from centered position, a normally closed microswitch 107, indicated by the dotted lines in FIGURE 3, is mounted in cap cavity 100. This microswitch 107 includes an operating plunger or other linkage 69 one end of which will seat in a detent-like notch or conical depression 109 in stem 99. When plunger 69 is so engaged, the switch contacts (at 71 in FIGURE 1) are closed, and when stem 99 is turned in either direction the normally closed contacts of the microswitch 107 are opened, thereby deenergizing solenoid 27 and shifting the reversing valve to failure condition.

As incorporated in the circuit of FIGURE 1, pressure fluid is applied via line 62 to the pressure port 78 of servovalve 60, line 63 being connected to the servovalve tank port 79. Line 64 and line 65 are connected to ports 77 and 80 respectively.

When a rotary signal is applied to control means 61 of servovalve 60, the electrically operated servovalve 33 is closed and rendered inactive by shifting of the reversing valve 26. Assuming that the rotary movement applied to control means 61 is such that the valve spool 92 is rotated in a direction connecting spool slot 96 to pressure port 78, pressure fluid flows through body groove 74, sleeve port 85, spool slot 96 into groove 93 and through sleeve port 87 into body groove 73 to port 77 to the stroking piston 18. A fluid path will simultaneously be opened from port 80 to port 79, via body groove 76, sleeve port 86, spool groove 94, slot 95, sleeve port 88 and body groove 75. Hence pressure fluid is admitted to one of the stroking cylinders and released from the other stroking cylinder, thereby turning the hanger angularly. Sleeve 82 does not turn with spool 92, but "follows" the spool as the hanger turns trunnion 15. That is, orientation is such that rotation of trunnion 15 turns spool 92 in a direction tending to close off the aforementioned flow paths, and when the hanger has been rotated an angular distance equal to the manually applied angular signal, application of further pressure fluid to the stroking pistons is cut off, and the hanger stops. Upon release of the control knob 61, the centering means 70 return it to centered position, thereby rotating the spool in the reverse direction and opening a flow path from the pressure port 78 to port 80 and from port 77 to tank port 79 so that the hanger is rotated in the opposite direction until it has returned the sleeve to a position closing off further flow through servovalve 60.

If solenoid 27 is deenergized at a time when the pump hanger is being controlled through electrical servovalve 33 and it off center at that moment, servovalve 60 will automatically take over to move the hanger to center position. The off-center position of the hanger will be reflected as a displacement of rotary valve sleeve 82 from its normal closed position with respect to spool 92, and flow will commence to the hanger through the open rotary servovalve in a direction rotating the hanger toward center and simultaneously rotating sleeve 82 toward a position closing off flow through servovalve 60.

While the rotary servovalve disclosed hereinbefore constitutes ap referred form of the manually controlled servovalve 60 for use in the system of this invention, it will be understood that the invention is not limited to use with that servovalve alone, but that other manually controlled servovalves, with or without the spring centering feature, may be utilized in place thereof, to provide a by-pass control circuit around the electrically controlled servovalve 33.

Having described my invention, what I claim is:

1. A system for changing the displacement of a cross-center hydraulic pump operated in association with electrical control circuitry, said pump having displacement changing means positioned by hydraulic piston means, said system comprising:
   an electrically controlled servovalve and a manually controlled servovalve each for regulating the application of pressure fluid from a source to said piston means,
   a reversing valve controlled by a solenoid, said reversing valve being connected through no-return valve means oriented to direct pressure fluid from said source to said piston means through said electrically controlled servovalve when said solenoid is energized and directing flow to said piston means through said manually controlled servovalve when said solenoid is not energized,
   both said servovalves being biased to a no-signal position in which they block flow therethrough to said piston means,
   means energizing said solenoid and means for deenergizing said solenoid in response to a malfunction of predetermined nature in said electrical control circuitry,
   and means for deenergizing said solenoid when said manually controlled servovalve is moved from said no-signal position.

2. The system of claim 1 wherein the two said servovalves each have a pressure port and a tank port, said reversing valve has a pair of work ports to which flow is directed alternately, and wherein said no-return valve means includes check valves connected to the respective pressure ports of said servovalves permitting flow only in the direction toward said pressure ports, and check valves connected to the respective tank ports of said servovalves permitting flow only in the direction away from said tank ports, the pressure ports of the respective servovalves being connected to different work ports of said reversing valve, the tank ports of the respective servovalves being connected to the respective opposite work ports of said reversing valve.

3. The system of claim 1 wherein said manually controlled servovalve is responsive to a rotary input signal to apply pressure fluid from said source to position said displacement changing means in accordance with the magnitude of said rotary signal.

4. The system of claim 3 wherein said manually controlled servovalve is spring biased toward a centered position thereof corresponding to zero pump displacement.

5. The system of claim 4 wherein said means for deenergizing said solenoid when said manually controlled servovalve is moved from no-signal position comprises switch means electrically connected in series with said solenoid and operated by said manually controlled servovalve, said switch means being closed when said manually controlled servovalve is in said centered position and opened when said manually controlled servovalve is moved from said centered position.

6. The system of claim 5 wherein said electrically controlled servovalve is operated by an electrical signal amplifier and wherein said system includes means responsive to malfunctioning of said amplifier to deenergize said solenoid.

7. The system of claim 6 wherein said reversing valve is spring biased toward a position directing flow to said piston means toward said manually controlled servovalve.

8. A fail-safe system for changing the displacement of a cross-center hydraulic pump operated in association with electrical control circuitry, said pump having displacement changing means positioned by hydraulic piston means, said system comprising:

an electrically controlled servovalve and a manually controlled servovalve connected in parallel branch lines to said piston means for applying pressure fluid from a source of pressure fluid to move said piston means, a check valve in each said branch line, a solenoid controlled reversing valve connected in series with both said servovalves, said reversing valve being shiftable to permit pressure fluid to flow from said source to said piston means alternately through said electrically controlled servovalve and through said manually controlled servovalve, said check valves being oppositely oriented and permitting flow to said piston means only through said manually controlled servovalve when said solenoid is deenergized, and circuit means deenergizing said solenoid in response to a failure of predetermined nature in the electrical control circuitry in association with which said pump is operated.

9. A system for operating the displacement changing means of a cross-center hydraulic pump comprising:

an electrically controlled servovalve connected to said displacement changing means, said servovalve regulating the application of pressure fluid from a source to said displacement changing means in accordance with an electrical signal, a manually controlled servovalve connected to said displacement changing means through a hydraulic line by-passing said electrically controlled servovalve, said manually controlled servovalve regulating the application of pressure fluid to said displacement changing means in accordance with an angular turning signal applied to a control handle associated therewith, means biasing said handle to a normal position corresponding to a displacement of substantially zero, means applying a mechanical feedback signal from said displacement changing means to said manually controlled servovalve, flow directing means operative in response to a malfunction of predetermined nature in said electrical signal to automatically block flow through said electrically controlled servovalve to said displacement changing means, and means operative in response to movement of said control handle from said normal position to cause said flow directing means to block flow through said electrically controlled servovalve.

10. The system of claim 9 wherein said flow directing means includes a valve operative to apply pressure fluid selectively to either of a pair of work ports, said valve being operated by an electric coil.

11. The system of claim 10 in which said valve is operative when said coil is not energized to block flow to said electrically controlled servovalve, and further wherein said system includes means deenergizing said coil whenever said electrically controlled servovalve is deenergized.

References Cited

UNITED STATES PATENTS

| | | | |
|---|---|---|---|
| 2,741,088 | 4/1956 | Andrews et al. | 103—162 |
| 3,186,310 | 6/1965 | Neff et al. | 103—38 |
| 3,299,829 | 1/1967 | Jackson et al. | 103—162 |
| 3,302,585 | 2/1967 | Adams et al. | 103—162 |

DONLEY J. STOCKING, *Primary Examiner.*

W. L. FREEH, *Assistant Examiner.*